United States Patent
Xu et al.

(10) Patent No.: US 10,067,877 B1
(45) Date of Patent: Sep. 4, 2018

(54) METHOD, APPARATUS AND COMPUTER PROGRAM PRODUCT FOR USE IN MANAGING MULTI-CACHE DATA STORAGE SYSTEMS

(71) Applicant: EMC Corporation, Hopkinton, MA (US)

(72) Inventors: Xinlei Xu, Beijing (CN); Liam Xiongcheng Li, Beijing (CN); Jian Gao, Beijing (CN); Lili Chen, Hopkinton, MA (US); Changyu Feng, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/198,717

(22) Filed: Jun. 30, 2016

(51) Int. Cl.
- G06F 12/00 (2006.01)
- G06F 12/0897 (2016.01)
- G06F 12/0873 (2016.01)
- G06F 13/00 (2006.01)
- G06F 13/28 (2006.01)

(52) U.S. Cl.
CPC ...... *G06F 12/0897* (2013.01); *G06F 12/0873* (2013.01); *G06F 2212/1016* (2013.01); *G06F 2212/225* (2013.01); *G06F 2212/283* (2013.01); *G06F 2212/305* (2013.01); *G06F 2212/313* (2013.01); *G06F 2212/466* (2013.01)

(58) Field of Classification Search
CPC ............. G06F 12/0897; G06F 12/0873; G06F 2212/1016; G06F 2212/225; G06F 2212/283; G06F 2212/305; G06F 2212/313; G06F 2212/466
See application file for complete search history.

(56) References Cited

U.S. PATENT DOCUMENTS

| | | | |
|---|---|---|---|
| 8,966,164 B1 * | 2/2015 | Asnaashari | G06F 12/0246 711/103 |
| 2007/0233933 A1 * | 10/2007 | Wang | G06F 12/0246 711/100 |
| 2009/0313436 A1 * | 12/2009 | Krishnaprasad | G06F 12/0802 711/129 |

\* cited by examiner

*Primary Examiner* — Mark A Giardino, Jr.
(74) *Attorney, Agent, or Firm* — Krishnendu Gupta; Jason A. Reyes

(57) ABSTRACT

Described herein are techniques for multi-cache data storage systems. The techniques comprise providing a volatile memory device to store data. The techniques also comprise providing a non-volatile storage device to store data. The techniques further comprise configuring a data storage system to form a multi-cache data storage system comprising a primary cache formed by the volatile memory device and the non-volatile storage device.

6 Claims, 4 Drawing Sheets

METHOD, APPARATUS AND COMPUTER PROGRAM PRODUCT FOR USE IN MANAGING MULTI-CACHE DATA STORAGE SYSTEMS

TECHNICAL FIELD

The present invention relates generally to data storage. More specifically, the present invention relates to a method, an apparatus and a computer program product for use in managing multi-cache data storage systems.

BACKGROUND OF THE INVENTION

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with data storage systems, or more generally any type of system, caching may be used whereby data of the cache may be used to service operations rather than data as may be stored on a slower storage medium, such as disk. When a requester requests data, there may be considerable latency incurred in the process of retrieving the data from the disk. A cache may store data in a memory characterized as a relatively fast memory that is separate from the disks in order to address some of the latency issues associated with disks. The cache memory may contain some or a portion of the data as stored on the disk. Upon receiving a request, for example, to read data, the data storage system may service the request using the cached data if such requested data is currently in the cache.

The use of solid-state storage devices is increasing in popularity as solid-state memory has advanced to the point where cost and density of memory is such that organizations can afford to operate with systems that store and process terabytes of data. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY OF THE INVENTION

There is disclosed a method, comprising: providing a volatile memory device to store data; providing a non-volatile storage device to store data; and configuring a data storage system to form a multi-cache data storage system comprising a primary cache formed by the volatile memory device and the non-volatile storage device.

There is also disclosed an apparatus, comprising: memory; and processing circuitry coupled to the memory, the memory storing program code which, when executed by the processing circuitry, cause the processing circuitry to: provide a volatile memory device to store data; provide a non-volatile storage device to store data; and configure a data storage system to form a multi-cache data storage system comprising a primary cache formed by the volatile memory device and the non-volatile storage device.

There is further disclosed a computer program product having a non-transitory computer readable medium which stores a set of instructions, the set of instructions, when carried out by processing circuitry, causing the processing circuitry to perform a method, the method comprising: providing a volatile memory device to store data; providing a non-volatile storage device to store data; and configuring a data storage system to form a multi-cache data storage system comprising a primary cache formed by the volatile memory device and the non-volatile storage device.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Figure 1:
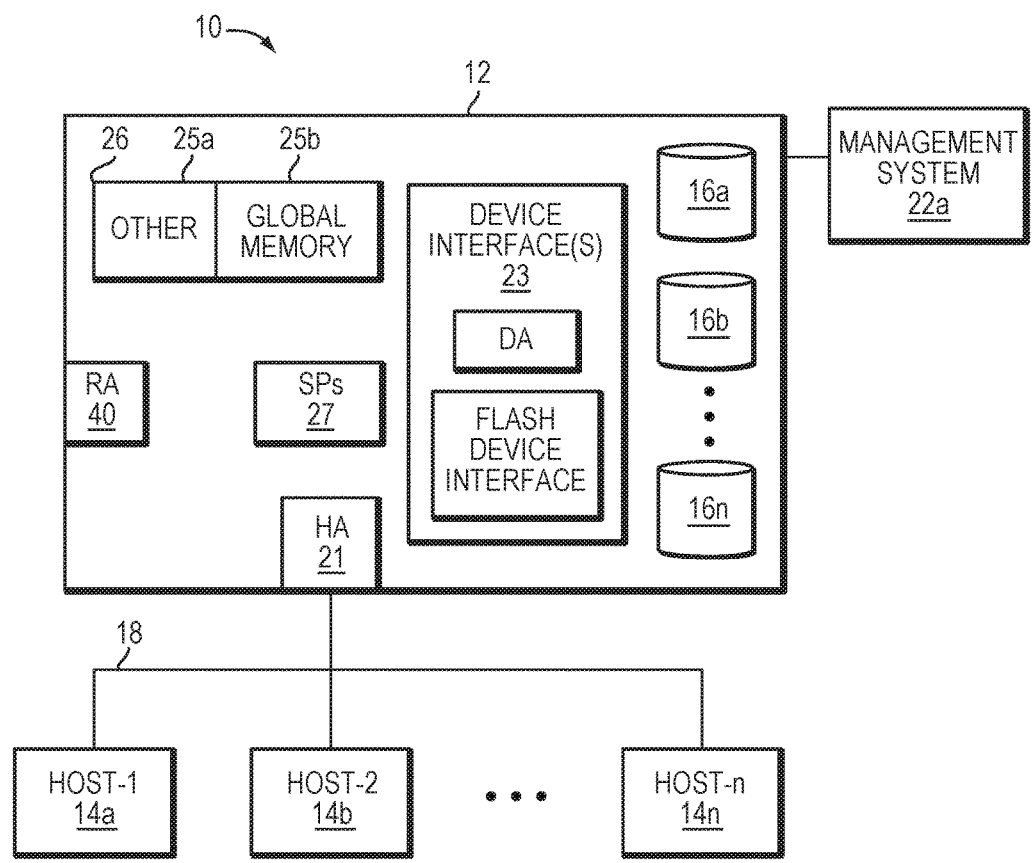
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

As known in the art, a LUN may have physical storage provisioned on one or more PDs of the data storage system where the LUN has a logical address space or range. Logical addresses of the LUN may be mapped to physical storage locations on the PDs. The logical address range for the LUN may, for example, range from a starting logical address of 0 to a maximum logical address that varies depending on the capacity of the particular LUN. In one embodiment, each logical address may denote a logical block address or offset from the starting LBA of 0. Each single block, such as LBA 0, may denote a block or generally some amount of storage that may vary with data storage system (e.g., block size may vary with data storage system).

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

In connection with a data storage system such as described herein, an I/O request may be a read request to read data. The read request may be received at the data storage system at a port of a front-end component of the data storage system (such as one of the HAs as described elsewhere herein). In terms of processing a read request, a determination may be made as to whether all the requested read data is in cache (e.g., a cache hit). If so, the read request may be characterized as a read hit. In such cases of a read hit, the front-end component, such as the HA, receiving the read request may service the read request by retrieving all requested read data from the cache and returning the requested read data to the host. If all the requested read data is not in cache, the read may be characterized as a read miss (e.g., cache miss) whereby processing is performed to retrieve from physical storage any portion of the requested data that is not currently in cache. As described above, one or more DAs may perform processing to retrieve from physical storage any portion of the requested data not currently in cache. Once all the requested read data is in cache, the front-end component, such as the HA, receiving the read request may service the read request by retrieving all requested read data from the cache and returning the requested read data to the host. In this manner, a front-end component may service read requests using data that is already stored in cache prior to processing the read request, as well as using data that is brought into cache from physical storage responsive to receiving the read request.

Storing such data in cache is performed with the goal of servicing subsequent I/Os using cached data without having to retrieve the data from physical storage. In an embodiment in accordance with techniques herein, processing may be performed as just described to unconditionally cache reads as a result of a cache miss and to execute a dependent sequence of steps whereby the DA writes read miss data (retrieved from physical storage) to cache and the HA then retrieves the requested data from the cache to return to the requesting host.

In connection with write operations, write data received at the data storage system may be stored in cache and then written out later to physical storage, such as written to backend physical storage devices by a DA. Once the write data is written into cache, the data may be marked as write pending (WP) in cache denoting that the cached write data is the most recent copy of the data and needs to be destaged to backend physical storage devices. The cache location including the WP data may marked as dirty thereby indicating that the cache location includes valid data and contains the most recent copy of the data but has not yet been synchronized with the copy on physical storage of the back end. Once the write data is written to cache, the data storage system may send an acknowledgement to the host that the write operation has been completed even though the write data may not have yet been destaged from cache to the backend physical storage devices. Once the WP data has been destaged from cache to physical storage, the cache location including the write data may be characterized as clean where the cache location is valid and contains a copy of write data that has been synchronized with backend physical storage.

Figure 2:
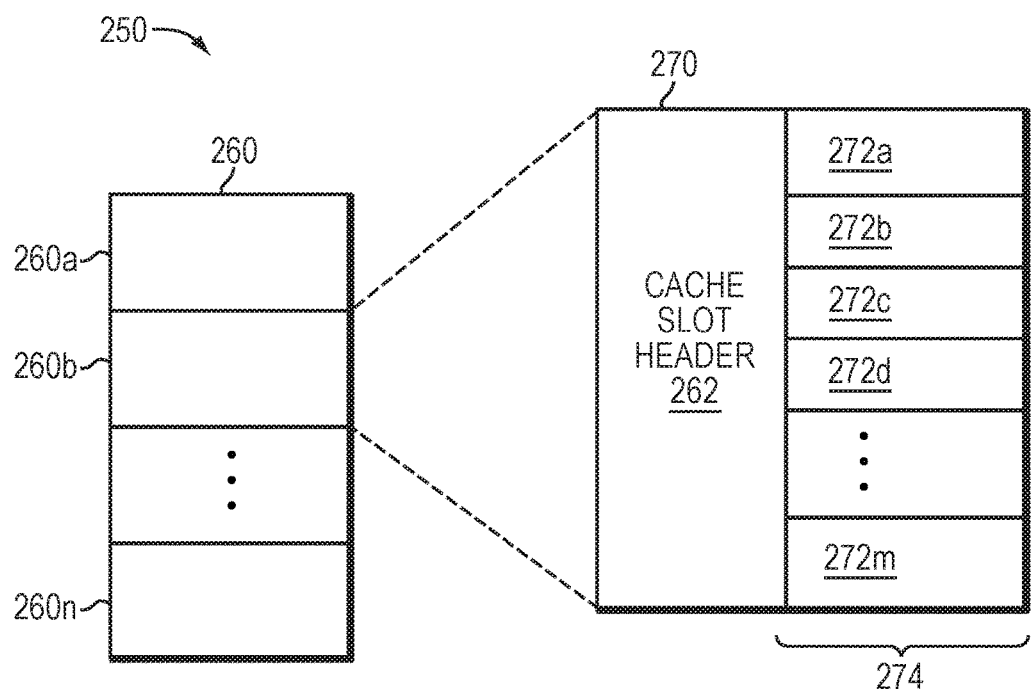
FIG. 2 is an example illustrating a logical representation of a cache that may be used in an embodiment in accordance with techniques herein.

Referring to FIG. 2, shown is an example illustrating a logical representation of a cache that may be used in an embodiment in accordance with techniques herein. The cache in FIG. 2 may denote generally a data cache that may be used as part of a plurality of cache layers in an embodiment of a data storage system described in more detail below. The cache such as illustrated in FIG. 2 may be, for example, a DRAM cache that is primary or first caching layer in the plurality of caching layers described in more detail elsewhere herein.

In the example 250, element 260 may represent the memory or storage used as the cache which is partitioned into cache slots 260a-260n. It should be noted that the example 250 is a logical representation of a cache that may be implemented using any suitable data structure(s) known in the art. Each of the cache slots 260a-n may contain varying amounts of write pending data. Consistent with description elsewhere herein, write pending data may be user data received in connection with a write operation where the user data has been stored in cache and is waiting to be destaged or written out to physical storage from cache.

Element 270 provides additional detail of single cache slot 260a. Cache slot 260a may include a cache slot header 262 and cache slot data 274. The cache slot data 274 illustrates that a single cache slot of data may further include multiple portions 272a-m each of which may or may not include write pending data and each of which may or may not include any cached data. The cache slot header 262 may include additional information regarding the cached data stored in 274. For example, the header 272 may denote whether the data cached in each of the portions 272a-m is write pending data.

It should be noted that the particular granularity or smallest unit of storage for storing cached data may vary with embodiment. For example, each of the portions 272a-m may denote a smallest unit of storage for storing cached data. Additionally, the particular number of portions in a cache slot may also vary with embodiment.

Although not illustrated in FIG. 2 for simplicity and as known by those of ordinary skill in the art, an embodiment may store additional information for each of the cache slots regarding the data stored in area 274 of each such cache slot. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the cache 260 to retrieve and/or store data from the cache. For example, the HA may manage and/or use information mapping a LUN and LUN offset to a cache location including data stored at the LUN offset on the particular LUN. The DA may manage and/or use information mapping a PD and offset on the PD to a cache location including data stored at the offset on the particular PD. In one embodiment, for example, the foregoing mapping of a LUN location so its physical device location may be included in the location information of MD associated with user data described in more detail elsewhere herein.

Figure 3:
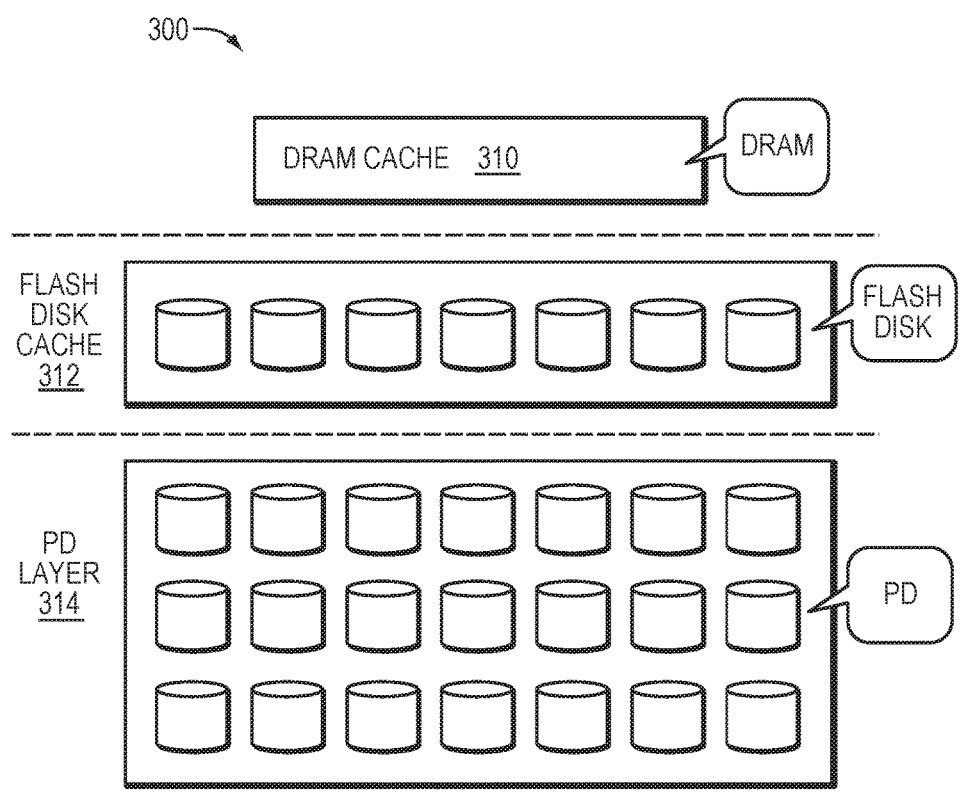
FIG. 3 is an example illustrating a plurality of layers that may be included in an I/O path in an embodiment in accordance with techniques herein.

Referring to FIG. 3, shown is an example illustrating a plurality of layers including caches and physical backend storage in an embodiment in accordance with techniques herein. The example 300 includes DRAM cache 310, flash disk cache 312, and a backend physical storage device (PD) layer 314. The flash disk cache 312 may include flash-based storage devices or other solid state storage. The PD layer 314 may include, for example, rotating disk drives that provide non-volatile storage for data and may be organized into groups such as RAID groups providing the backend PDs which may be accessed, for example, by DAs when reading data from the PDs (such as to read data from the PD and then store such read data in the DRAM cache 310 cache to service a read miss) and/or when writing data to the PDs (such as to destage data from DRAM cache 310).

In at least one embodiment of a data storage system in the illustrated hierarchy of FIG. 3, the Flash Disk Cache 312 is under the DRAM or general data cache 310, and below the Flash Disk Cache 312 are backend PDs 314. Generally, the DRAM cache 310, also referred to herein as the cache or data cache, may be the primary or highest caching layer such as mentioned above where read and write data are placed on first instance in connection with an I/O operation. Thus, in one aspect, the DRAM cache 310 may denote a level 1 (L1) primary cache and the Flash disk cache 312 may denote a level 2 (L2) secondary cache. Element 310 may denote, for example, the cache to which data is first written when write operations are received by the host such as described above. Generally, the layers of FIG. 3 may be ranked, in terms of relative performance, from highest to lowest, as follows: DRAM cache 310, the flash disk cache 312, and PDs 314. The Flash disk cache 312 may include flash-based storage devices. More generally, the flash disk cache 312 may include a form of solid state or other storage that may be non-volatile which fits in with the above-mentioned relative performance ranking.

Flash disk cache 312 may be characterized as a storage-system component that improves performance by transparently storing or promoting data from PDs 314 into Flash Disk media (Flash disk) of layer 312, so that user requests for data can be served much faster than if retrieved from PDs 314. PDs of layer 314 may be used to store all the user data and serve the I/O requests which cannot be serviced by using data from either DRAM cache 310 or Flash disk cache 312. Generally, as mentioned above, PDs of layer 314 provide the slowest response time of all layers 310, 312 and 314 when there is a need to access the PD to read data therefrom and/or write data thereto.

Data may be promoted from PDs 314 to the Flash cache 312 based on "temperature" related to I/O activity or frequency of access (e.g. number of reads and/or writes for the data). Placing or promoting data chunks from PDs 314 is not dependent on whether the data is already in DRAM cache 310. In at least one embodiment, the PDs 314 may denote rotating disk drives or more generally PDs having a lower performance than the flash-based drives of layer 312. In at least one embodiment, data may be stored in the Flash disk cache in chunks, such as chunks that are each 64 KB in size. It should be noted that in some systems, the backend physical storage devices may also include flash-based storage devices having an expected level of performance similar to those physical storage devices of the Flash disk cache 312. In such cases, an embodiment may decide not to use the Flash disk cache 312 with user data stored on back-end physical storage devices which are flash-based since there is similar performance when accessing data from either the back-end physical storage devices or Flash disk cache 312. Rather, an embodiment may selectively choose to enable or use the Flash disk cache 312 in connection with user data that will more generally see a performance benefit in obtaining data from the Flash disk cache rather than back-end storage devices. Thus, generally, the PDs of 314 may include rotational disk drives, or more generally, PDs having an excepted level of performance that is less than the expected level of performance when accessing data from drives or physical storage comprising the Flash disk cache 312.

In a manner similar to that as described in connection with FIG. 2, a memory map or mapping information may be maintained by the Flash disk cache layer 312 to indicate whether a particular data portion located at a particular LUN and offset (e.g., LBA) is currently stored in the Flash disk cache and if so, the particular location in the Flash disk cache where such data is located. In addition to the mapping information, the Flash disk cache 312 may also store information indicating whether the data stored in a cache page of the Flash disk cache 312 is dirty thereby denoting that the cache location includes valid data and contains the most recent copy of the data but has not yet been synchronized with the copy on of the PD layer 314. Generally, in addition to mapping information, the Flash disk cache layer 312 may use a structure referred to herein as the shadow cache to store other metadata that may be used by the Flash disk cache 312. For example, the shadow cache may store information regarding the access frequency of different data portions located at various LUN locations where such LUNs have storage provisioned from PDs of the PD layer 314. Thus, the frequency of access information in the shadow cache may be used to determine when to promote data from the PD layer 314 to the Flash disk cache 312.

It should also be noted that the Flash disk cache layer 312 may also experience cache or read hits and also cache or read misses with respect to whether requested read data is stored in the Flash disk cache 312. Thus, the Flash disk cache 312 may have associated states and experience cache hits and misses in a manner similar to the DRAM cache 310 used as the primary or level 1 cache in the hierarchy of FIG. 3.

Generally, the first time data is accessed for read or write, the data is stored in the DRAM cache 310 as the primary data cache in connection with I/O processing of the data path. Processing may be performed to monitor how frequently a particular data portion is accessed (such as within a specified period of time) to determine whether such observed access frequency reaches a threshold level to warrant storing such data also in the Flash disk cache layer 312. The shadow cache described above may be used by the Flash disk to track such access frequency for data at different LUN locations and determine when to promote a data portion stored at a particular LUN location from PDs 314 to the Flash disk cache 312.

In at least one embodiment the DRAM Cache 310 may cache the hottest (e.g., most frequently accessed) data and Flash Disk Cache 312 may cache data that is relatively less frequently accessed than data of the DRAM cache 310.

In connection with processing an I/O operation such as a read operation, processing may first determine whether the requested read data is in the primary data cache, such as the DRAM cache 310. If so, the requested data is read from cache and returned to the requester. If the requested read data is not in the primary data cache (e.g., DRAM cache 310), processing may determine whether the requested data is stored in the Flash disk cache. If so, the requested data is obtained from the Flash disk cache 312 and returned to the requester. If the requested data is not in the Flash disk cache 312, the requested data is obtained from PDs 314, may be stored in the DRAM cache 310 and then returned to the requester. Additionally, depending on frequency of access as described elsewhere herein, the data may also be stored in the Flash disk cache.

In connection with write operations, the write data is written to the primary data cache, such as the DRAM cache 310, and an acknowledgement is returned to the requester that the write operation has complete. At some later point in time, processing may be performed to destage the write data from the DRAM cache 310. As mentioned elsewhere herein, data, such as the write data being destaged, may be promoted to the Flash disk cache if there has been sufficient frequency of access to such write data. Thus, as part of destaging the write data from the DRAM cache 310, processing may include determining whether the write data has been promoted to the Flash disk cache. If so, the write data is stored in the Flash disk cache and then later may be flushed from the Flash disk cache to the PDs 314. If the write data is not promoted to the Flash disk cache, the data is written out from the DRAM cache directly to the PDs 314.

In some embodiments, it may be that write caching to the primary data cache, such as DRAM cache 310, is disabled whereby caching may be performed with respect to only the Flash disk cache layer 312. In such a case, the write data received is not stored in the DRAM cache 310 when received and rather the write operation data processing proceeds directly to the Flash cache layer where a determination is made as to whether to store the data in the Flash disk cache. As noted elsewhere herein, such a determination may be made based on whether there has been a sufficient level of access frequency (e.g., above a specified threshold level of activity) to the write data to warrant storing or promoting the write data to the Flash disk cache. If it is determined that the write data has not been promoted to the Flash disk cache, the write data is written directly to the PDs 314. Otherwise, if it determined that the write data has been promoted to the Flash disk cache, the write data is written to the Flash disk cache and then some time later may be flushed to the PDs 314.

In an embodiment in accordance with techniques herein, the I/O path denoting the processing path taken in connection with processing a user or host I/O operation may pass through the layers such as illustrated in FIG. 3.

It should be noted that data storage systems that comprise a plurality of layers including caches and physical backend storage such as those described above with respect to FIG. 3 have a number of advantages. For example, performance of these data storage system can be improved over conventional systems by transparently storing or promoting data from PDs 314 into Flash Disk media (Flash disk) of layer 312 so that user requests for data can be served much faster than if retrieved from PDs 314. However, some of the data storage systems of the type just described also have limitations. For instance, because the cache 310 comprises volatile memory, the data storage system needs to include a battery to ensure that in the event of a power loss the data storage system is kept working for a certain amount of time such that it can flush all the dirty data from DRAM to persistent storage to avoid data loss. This is inconvenient. Also, hardware design limits DRAM size as it is very hard to design a single mainboard to support many memory slots.

Additionally, in conventional data storage systems, such as the VNXe® data storage system by EMC Corporation of Hopkinton, Mass., the metadata relating to cache 312 is stored both in DRAM primary cache 310 and SSDs that form secondary cache 312. The reason for two copies is that in the event of a power loss the data in cache 310 may be lost and cache 312 may be required to load metadata from the SSDs to cache 310 when the power comes back. Also, the capacity of cache 310 is limited, so utilizing DRAM to store metadata means that the memory left to cache user hot data will be impacted by how much memory is used by metadata. Even worse, when SSD cached data goes from clean to dirty or dirty to clean, there is extra metadata IOs required to update the metadata on SSDs to make sure that there is no metadata loss when power off. This extra metadata update can reduce the IO response time and SSD performance.

As a result of the above, and in an attempt to address some of the highlighted limitations, the data storage system in at least one embodiment described herein includes one or more SSD devices configured and arranged to expose an NVMe interface over a PCI-E interface such that a processor in the data storage system will see the devices as normal block devices and use NVMe protocol to read/write data from the devices. It should be understood that hereinafter an SSD device that exposes NVMe interface over PCI-E interface is referred to as an NVMe device.

Also, in at least one embodiment described herein, one or more SSD devices in the data storage system are configured and arranged to expose a Direct Memory Interface (DMI) over a PCI-E interface such that a processor in the data storage system sees this device as memory and use memory semantics; i.e., load and store and DMA engines to access data in this device. SSD devices that expose DMI over PCI-E interface are referred to herein as NVRAM devices which are essentially random-access memory that will not lose data when power is lost. NVRAM devices, advantageously, also have extremely high performance; for example, 64 Byte random read/write and up to tens of million IOPS.

With this in mind, there is described hereinafter some techniques that leverage the NVMe and NVRAM devices, and maximize use of DRAM to cache more user hot data, in order to address at least some of the above limitations and improve the overall performance of the storage system.

Figure 4:
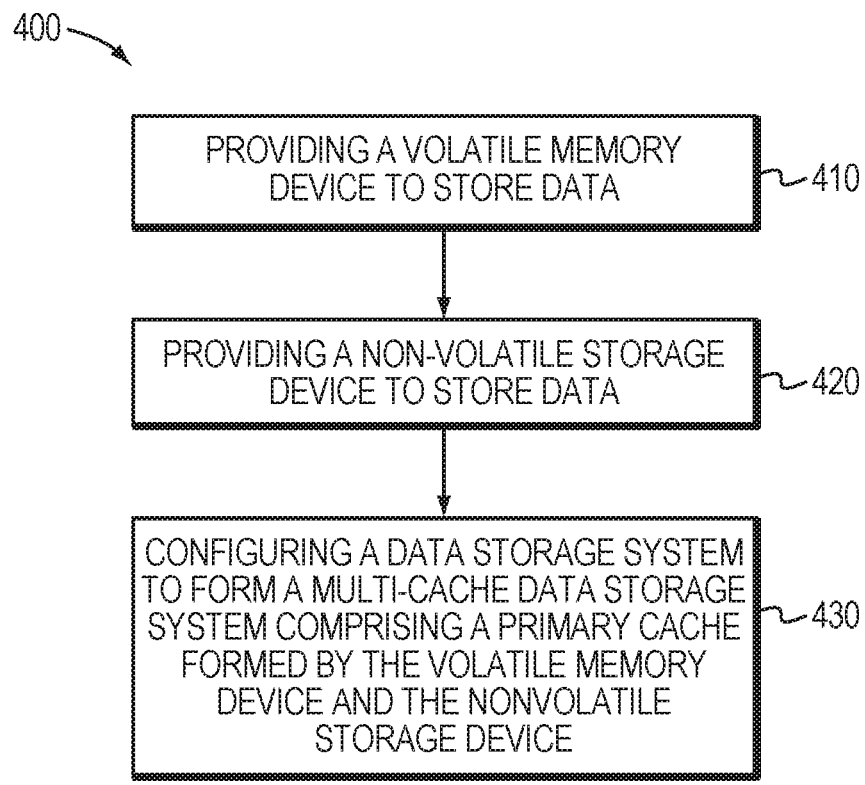
FIG. 4 is a flowchart of processing steps that may be performed in an embodiment in accordance with techniques herein.

Referring to FIG. 4, there is illustrated a flowchart 400 of processing steps that may be performed in an embodiment in accordance with techniques herein. In the flowchart 400, the steps are summarized in individual blocks. The steps may be performed in hardware, or as processor-executable instructions that may be executed by a processor. Furthermore, the steps may, but need not necessarily, be implemented in the system of FIG. 1.

In step 410, a volatile memory device is provided to store data (e.g., DRAM memory device). In step 420, a non-volatile storage device is provided to store data (e.g., NVRAM devices). In step 430, a data storage system is configured to form a multi-cache data storage system comprising a primary cache formed by the volatile memory device and the non-volatile storage device.

It should be understood that in at least one embodiment the hardware architecture of the data storage system may include a storage processor configured and arranged to have a DM slot to insert a DRAM memory and use a PCI-E link to link to a PCI-E switch and an NVMe device. Both HDD and SSD may use SCSI protocol linked to the storage processor. Also, it be noted that when system boots up, the primary cache 310 as described above with respect to FIGS. 3 and 4 will include two separate memory spaces; i.e., a first part formed by DRAM and a second part formed by NVRAM device. The first part is mapped from RAM and may be used to cache user hottest data. The second part is mapped from NVRAM device and may be used to cache user hotter data and metadata (e.g., other driver's metadata). For example, in one embodiment, a flash cache driver is implemented as a virtual device, and it can receive/response IOs and generate internal IOs to promote/flush/clean cached pages in SSD disks. In such an example, the metadata associated with the promote/flush/clean actions of the flash cache driver associated with the secondary cache may be stored in the NVRAM device. The NVMe devices, SSDs and HDDs are block devices, managed by RAID manager, to form the secondary cache 312 and PDs of the PD layer 314.

As discussed, it should be understood that when the storage system boots up with NVRAM device, the primary cache 310 will include two different memory spaces, one memory space can be referred to as "normal memory", data in this memory space will be lost when array lose power, another memory space can be referred to as "metadata memory", data in this memory space will not be lost when the system loses power. The goal for "metadata memory" is used to cache drivers metadata, but if other drivers do not acquire all the spaces of this memory, this space of memory can be used to store user data in order to maximum use of all the memory spaces to improve storage system performance.

When other drivers acquire metadata memory, the process flow can include multiple steps. For example, if NVRAM device has enough space available, other drivers can always request and get metadata memory, and this part of memory is persistent memory (data will not loss when system power off) which means drivers don't need to take care of this part of data to make sure there is no data loss when system loses power. If there is no metadata memory available in the data storage system or insufficient memory, other drivers can get normal volatile memory (data will be lost when the system power off), and there will be a need to take care of this data to make sure if power is off there is no metadata loss, such that metadata can be reloaded from persistent storage when data storage system is back online. Alternatively, in the event that there is no metadata memory available or insufficient memory, user data may be flushed therefrom in order to make memory available.

Also, when driver gets metadata memory, and when there is IOs coming from host, the driver only needs to take care of the data update. This contrasts with conventional approaches described above which must also take care to store the metadata in volatile and non-volatile memory (i.e., DRAM and SSD). The IO path in this new embodiment is simple in that it reduces the metadata update IOs, write IO latency is reduced and overall system performance is improved.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method, comprising:
creating a NVRAM (non-volatile random-access memory) device and a NVMe (non-volatile memory express) device from a SSD (solid state drive) in a data storage system such that the respective NVRAM and the NVMe devices are viewed as memory and a storage device by a processing device in the data storage system, wherein the NVRAM device and the NVMe device are created by the SSD exposing a DMI (direct memory interface) interface and a NVMe interface to the processing device:
forming a cache memory comprising two separate memory spaces, wherein one memory space is configured to store user data in the cache memory and derives from DRAM and the other memory space is configured to store metadata in the cache memory and derives from the NVRAM device: and
managing one or more NVMe devices, one or more SSDs and one or more HDDs (hard disk drives) in the data storage system such that the said NVMe devices, SSDs and HDDs are arranged to store user data persistently in the data storage system.

2. The method as claimed in claim 1, further comprising:
receiving a request to store metadata in the cache;
accepting the request to store the metadata; and
storing the metadata in the portion of the cache formed by the NVRAM device.

3. An apparatus, comprising:
memory; and
processing circuitry coupled to the memory, the memory storing program code which, when executed by the processing circuitry, cause the processing circuitry to:
create a NVRAM (non-volatile random-access memory') device and a NVMe (nonvolatile memory express) device from a SSD (solid state drive) in a data storage system such that the respective NVRAM and the NVMe devices are viewed as memory and a storage device by a processing device in the data storage system, wherein the NVRAM device and the NVMe device are created by the CCD exposing a DMI (direct memory interface) interface and a NVMe interface to the processing device:
form a cache memory comprising two separate memory spaces, wherein one memory space is configured to store user data in the cache memory and derives from DRAM and the other memory space is configured to store metadata in the cache memory and derives from the NVRAM device: and
manage one or more NVMe devices, one or more SSDs and one or more HDDs (hard disk drives) in the data storage system such that the said NVMe devices, SSDs and HDDs are arranged to store user data persistently in the data storage system.

4. The apparatus as claimed in claim 3, wherein the memory also stores program code which, when executed by the processing circuitry, cause the processing circuitry to:
receive a request to store metadata in the cache;
accept the request to store the metadata; and
store the metadata in the portion of the cache formed by the NVRAM device.

5. A computer program product having a non-transitory computer readable medium which stores a set of instructions, the set of instructions, when carried out by processing circuitry, causing the processing circuitry to perform a method, the method comprising:
creating a NVRAM (non-volatile random-access memory) device and a NVMe (non-volatile memory express) device from a SSD (solid state drive) in a data storage system such that the respective NVRAM and the NVMe devices are viewed as memory and a storage device by a processing device in the data storage system, wherein the NVRAM device and the NVMe device are created by the SSD exposing a DMI (direct memory interface) interface and a NVMe interface to the processing device:
forming a cache memory comprising two separate memory spaces, wherein one memory space is configured to store user data in the cache memory and derives from DRAM and the other memory space is configured to store metadata in the cache memory and derives from the NVRAM device; and
managing one or more NVMe devices, one or more SSDs and one or more HDDs (hard disk drives) in the data storage system such that the said NVMe devices, SSDs and HDDs are arranged to store user data persistently in the data storage system.

6. The computer program product as claimed in claim 5, further comprising:
receiving a request to store metadata in the cache;
accepting the request to store the metadata; and
storing the metadata in the portion of the cache formed by the NVRAM device.

* * * * *